Figure 1:
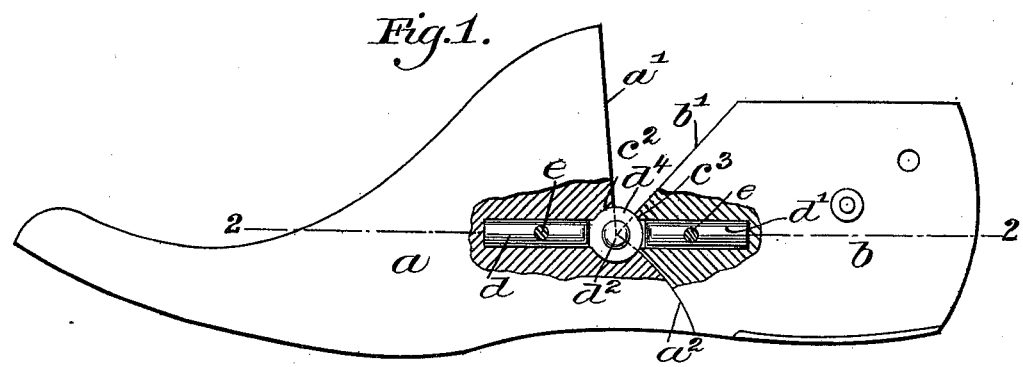

No. 640,076. Patented Dec. 26, 1899.
W. B. ARNOLD.
LAST.
(Application filed Aug. 9, 1898.)
(No Model.)

Witnesses
Louis N. Gowell
Geo. H. Maxwell

Inventor
William B. Arnold
by Crosby & Gregory
attys.

UNITED STATES PATENT OFFICE.

WILLIAM B. ARNOLD, OF ABINGTON, MASSACHUSETTS.

LAST.

SPECIFICATION forming part of Letters Patent No. 640,076, dated December 26, 1899.

Application filed August 9, 1898. Serial No. 688,174. (No model.)

*To all whom it may concern:*

Be it known that I, WILLIAM B. ARNOLD, of North Abington, county of Plymouth, State of Massachusetts, have invented an Improvement in Lasts, of which the following description, in connection with the accompanying drawings, is a specification, like letters on the drawings representing like parts.

My invention is an improvement in hinged or divided lasts, and has a twofold object, viz: cheapening of the manufacture of such lasts and the provision of means for rendering such manufacture more simple and accurate than heretofore.
In carrying out my invention I employ hinges of the dowel or plug-like type.

Lasts have heretofore been manufactured with hinges of this general type, a pair of holes being bored in each part of the last longitudinally thereof to receive the adjacent ends of the hinges; but very serious and awkward difficulties have arisen in such manufacture, particularly in properly locating the two hinges so as to bring their pintles in accurate alinement at the point required, for, as will be obvious to those skilled in the art, if the holes or sockets for the hinges were bored to the slightest extent deeper than necessary the opportunity would thereby be given for the hinges to enter that part of the last farther than they should, thereby bringing one or both pintles within the last instead of exactly on the line of cut, as they should be, and also the hinges were liable to rotate slightly in their sockets, thereby deflecting their pintles from a true horizontal. One method which has heretofore been employed for bringing these hinge-pintles into approximately proper alinement has been after the holes had been bored and the hinges had been inserted to flex the last, thereby compelling the hinges to position themselves; but this method not only takes time, but is liable to leave the parts of the last slightly separated or out of proper position and is at best an unmechanical and uncertain way of curing the difficulties. Accordingly I have invented the herein-disclosed last and union therefor, in which all the above-noted difficulties are effectually removed and my above-noted twofold object is attained, my invention comprising the provision of a lateral offset in the hinge-recess immediately adjacent the line of cut and at the point of flexure of the parts of the last, my special hinge connection or union having an enlargement or stop at the pintle corresponding in shape to said offset, said offset and enlargement coöperating to properly position the union or hinge within the last as the hinge is inserted, said enlargement being preferably in the form of an ear or flange-like strengthening-rib around the pintle of the hinge, which not only limits the insertion of the hinge into the last, but also (coöperating with the said offset) compels the pintle to occupy a strictly horizontal position.

A further feature of my invention in its preferred embodiment as herein shown resides in materially decreasing the weight of metal of the hinge union and at the same time reducing the cost of manufacture and providing a stronger and superior hinge.

Figure 2:
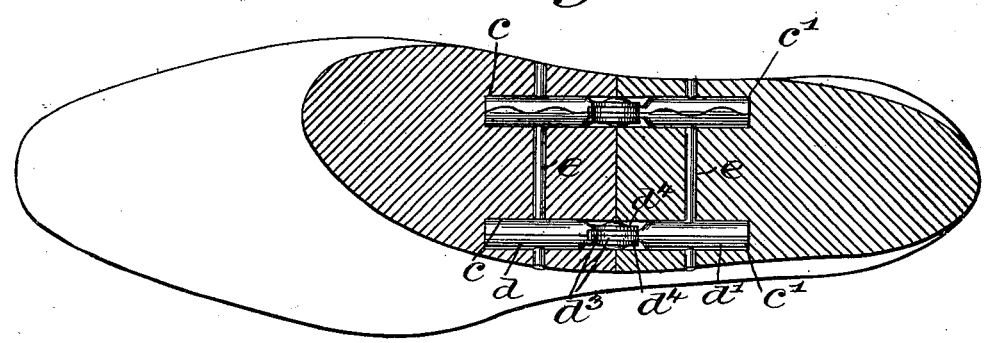
Figure 3:
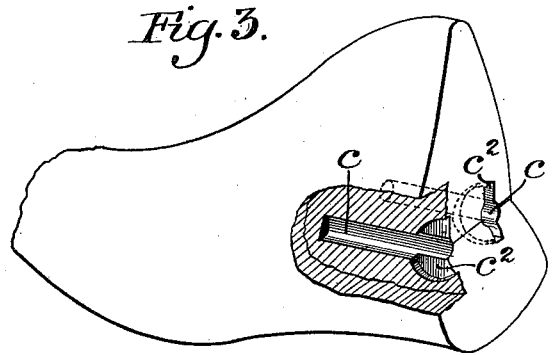
Figure 4:
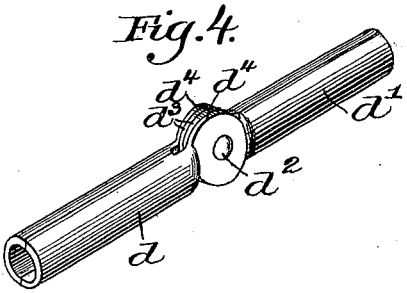
Figure 5:

In the drawings, Figure 1 is a view in side elevation of a usual Arnold last, parts being broken away in order to show my present improvements therein. Fig. 2 is a horizontal section thereof, taken on the line 2 2, Fig. 1. Fig. 3 is a perspective view of the rear end of the fore part of the last, showing the peculiar sockets and their offsets, which constitute an important feature of my present invention. Fig. 4 is a perspective view of my improved hinge. Fig. 5 is a plan view of one of the blanks of the hinge in the process of manufacture.

The last may be of any usual or preferred style, being herein shown as comprising a fore part $a$ and heel part $b$, divided on the lines of cut $a'$ $a^2$ $b'$. The fore part and heel part of the last are bored or otherwise provided with opposite alined recesses $c$ $c'$. I have herein shown these recesses as cylindrical in form, although it will be understood that they may be of any other cross-sectional shape desired, and indeed for that matter I do not intend to limit my invention to having these recesses in longitudinal alinement, inasmuch as my invention does not reside in the recesses $c$ $c'$, but is intended to be applicable to any and all forms of hinged lasts and their unions which are or may be of this general type or character. As heretofore provided the recesses $c$ $c'$ have been cylindrical throughout their entire extent from the extreme entrance at the meeting walls of the fore part and heel part to their inner ends. According to my invention, however, I provide at the outer or meeting ends of these recesses one or more offsets $c^2$ $c^3$. These offsets may be of any shape and size, provided they afford a shoulder or abutment adjacent the recesses $c$ $c'$, which will act as a seat to limit the entrance of the hinge or special union which may be employed to connect the parts of the last. As herein shown, these offsets $c^2$ $c^3$ are circular in shape and extend in a vertical plane oppositely alined, being formed by a small jig or tool somewhat resembling a small buzz-saw against which the last is run, the extent of the saw cut or kerfs being regulated by a fixed stop on the jig. I have not shown said special tool, inasmuch as it forms no essential part of the present invention.

The union or hinge is shown in enlarged detail in Fig. 4, one of the blanks of which it is composed being shown in Fig. 5, where it will be seen that it is made up of four leaves $d$ $d'$, hinged together on a pintle $d^2$, these leaves being preferably similar, excepting that the leaves $d'$ have their flanges $d^3$ face to face, while the flanges $d^4$ of the leaves $d$ are separated sufficiently to embrace the flanges $d^3$, said several flanges being of such shape that they project beyond the general extent of the hinge, so as to conform in shape to the offsets $c^2$ $c^3$ and constitute stops or enlargements accurately fitting within and filling the aforesaid offsets of the recesses. The leaves $d$ $d'$ are stamped or bent into shape to correspond to the recesses $c$ $c'$, such shape being herein shown as cylindrical, and in order that the leaves may be compelled to support each other in resisting all longitudinal strains brought to bear thereon I have indicated in dotted lines in Fig. 5 and have shown at the upper side of Fig. 2 said leaves as corrugated or made otherwise irregular at their edges, so as to interlock with each other when brought opposite to each other, as is clearly shown in Fig. 2. In some instances one set of the offsets will be sufficient and either of the offsets $c^2$ $c^3$ may be omitted.

From the above description it will be understood that when the hinge is inserted in its recesses the leaves snugly fit within the body of the recess, and the stops or enlargements formed by the flanges adjacent the pintle cannot be put in place excepting in their one and only proper position, and as these flanges which constitute the stops stand in a strictly vertical plane it follows that the pintles $d^2$ are necessarily brought into accurate horizontal alinement simply by the insertion of the hinges in the last. The hinges having been put in place, as stated, transverse holes are bored through the last and hinges, and the retaining-pins $e$ are inserted in usual manner.

Various changes in form and relation of parts may be resorted to within the spirit and scope of my invention.

I am aware of a certain ornamental hinge used by piano-makers and jewelers in which opposite dowels are provided at the pintle with a spherical enlargement, so that when the jewel-box, for example, is closed the hinge will externally exhibit an ornamental and smooth knob, and I disclaim such construction, as my invention is specially for a last and is entirely different in purpose, construction, and results, as already fully explained. For gaining the proper alinement of the pintles the enlargements cannot be spherical, but must have a greater diameter in one direction than in another, so as to prevent their rotating axially, and preferably they will have their extended position or greatest diameter in a vertical direction, as shown. In other words, the enlargements are angular in cross-section and preferably have vertical side walls, so that their longest diameter is transverse of the pintle.

Having described my invention, what I claim, and desire to secure by Letters Patent, is—

1. A divided last having its fore part and heel part each provided with two independent recesses extending longitudinally thereof from the dividing-line of cut of the last, offsets from certain of said recesses being formed at the line of cut, combined with hinge unions comprising dowel or plug-like ends secured within said recesses and having enlargements or stops adjacent their pintles fitting into and coöperating with said offsets, said enlargements being greater in diameter in one direction than in another, substantially as described.

2. A divided last having its fore part and heel part each provided with two independent recesses extending longitudinally thereof from the dividing-line of cut of the last, vertically-extended offsets from certain of said recesses being formed at the line of cut, combined with hinge unions comprising dowel or plug-like ends secured within said recesses and having enlargements or stops adjacent and extended transversely of their pintles fitting into and coöperating with said offsets, substantially as described.

3. A divided last having its fore part and heel part each provided with two independent recesses extending longitudinally thereof from the dividing-line of cut of the last, coöperating offsets being formed extending from said recesses at said line of cut, combined with hinge unions comprising dowel or plug-like ends secured within said recesses and having enlargements or stops adjacent their pintles and angular in cross-section fitting into and coöperating with said offsets, substantially as described.

4. A divided last having its fore part and heel part each provided with two independent recesses extending longitudinally thereof from the dividing-line of cut of the last, circular, coöperating offsets with vertical side walls being formed extending from said recesses at said line of cut, combined with hinge unions comprising dowel or plug-like ends secured within said recesses and having laterally-extending flanges surrounding their pintles, said flanges constituting circular stops having their longer diameter transverse of the pintle fitting into and coöperating with said circular offsets, substantially as described.

5. A divided last having its fore part and heel part hinged together, one or more members of the hinge union thereof being formed with opposite leaves extending from the hinge-pintle and stamped or bent in semicylindrical form, together constituting a hollow, plug-like end, and the adjacent part of the last having a cylindrical recess within which said plug-like end is secured, substantially as described.

6. A divided last having its fore part and heel part hinged together, one or more members of the hinge union thereof being formed with opposite leaves extending from the hinge-pintle and stamped or bent in semicylindrical form, said opposite leaves having their meeting edges interlocked and together constituting a hollow, plug-like end, and the adjacent part of the last having a cylindrical recess within which said plug-like end is secured, substantially as described.

In testimony whereof I have signed my name to this specification in the presence of two subscribing witnesses.

WILLIAM B. ARNOLD.

Witnesses:
   GEO. H. MAXWELL,
   GEO. W. GREGORY.